(12) United States Patent
Choi

(10) Patent No.: US 6,950,457 B2
(45) Date of Patent: Sep. 27, 2005

(54) SIGNAL PROCESSING METHOD FOR USE IN AN ARRAY ANTENNA SYSTEM IN CDMA MOBILE TELECOMMUNICATIONS NETWORK AND RECORDING MEDIUM THEREFOR

(75) Inventor: Seung-Won Choi, Seoul (KR)

(73) Assignees: Hantel Co., Ltd., Seoul (KR); SAS Technologies Co., Ltd., Soul (KR)

( * ) Notice: Subject to any disclaimer, the term of this patent is extended or adjusted under 35 U.S.C. 154(b) by 935 days.

(21) Appl. No.: 09/734,670

(22) Filed: Dec. 13, 2000

(65) Prior Publication Data

US 2001/0021181 A1 Sep. 13, 2001

(30) Foreign Application Priority Data

Dec. 15, 1999 (KR) ........................................ 1999-58065

(51) Int. Cl.[7] .............................................. H04B 1/707
(52) U.S. Cl. ...................... 375/148; 375/144; 370/335; 370/342
(58) Field of Search ................................. 375/144, 148, 375/267, 347, 147; 370/335, 342, 522; 455/500, 132

(56) References Cited

U.S. PATENT DOCUMENTS 5,999,800 A * 12/1999 Choi et al. .................... 455/73
6,166,690 A * 12/2000 Lin et al. ..................... 342/383
6,404,803 B1 * 6/2002 Wang et al. .................. 375/148
6,411,612 B1 * 6/2002 Halford et al. ............... 370/347
6,434,375 B1 * 8/2002 Chulajata et al. ........ 455/276.1

FOREIGN PATENT DOCUMENTS

JP          09191209 A   *   1/1996

OTHER PUBLICATIONS

T.A. Denidni and G.Y. Delisle, "A Nonlinear Algorithm for Output Power Maximization of an Indoor Adaptive Phased Arraay", IEEE Transactions on Electromagnetic Compatibility, vol. 37, No. 2, pp. 201–209 (May 1995).

* cited by examiner

Primary Examiner—Young T. Tse
(74) Attorney, Agent, or Firm—Greenblum & Bernstein, P.L.C.

(57) ABSTRACT

A signal processing method is for use in an array antenna system included in a Code Division Access (CDMA) mobile telecommunications network base station. The signal processing method includes initializing a weight vector and a snapshot index; obtaining a gradient of output power of an array antenna to a phase of each of the antennas in the array antenna system at every snapshot and determining whether an adaptive gain is added or subtracted depending on the signature of the gradient to update the phase of each antenna; and determining a weight value for each of the antennas to apply the weight value to a signal received at the corresponding one of the antennas.

10 Claims, 5 Drawing Sheets

SIGNAL PROCESSING METHOD FOR USE IN AN ARRAY ANTENNA SYSTEM IN CDMA MOBILE TELECOMMUNICATIONS NETWORK AND RECORDING MEDIUM THEREFOR

FIELD OF THE INVENTION

The present invention relates to a signal processing method for use in an array antenna system included in a CDMA (Code Division Multiple Access) mobile telecommunications network base station, and, more particularly, to a signal processing method, for use in a CDMA adaptive array antenna system, for forming a beam pattern by maximizing a transceiving gain in a direction toward a target mobile station and maximizing the beam pattern in a moving direction of each target mobile station during signal transceiving between a base station and a mobile station, and a recording medium therefor.

PRIOR ART OF THE INVENTION

Generally, in a wireless telecommunications, a source signal and an interference signal are included in a received signal and, more typically, a plurality of the interference signals exist along with the source signal. Communication distortion due to such interference signals depends on ratio of the power of the source signal to sum of powers of other signals. Therefore, even if the power level of the source signal is much higher than that of each of the interference signals, the sum of powers of the interference signals is very high when the number of the interference signals is large so that the communication distortion frequently occurs. Conventionally, this distortion leads to a serious problem of difficulty in information recovery of the source signal.

On the other hand, in order to solve the problem as described above, a technology employing an active phased array antenna already has been developed and there have been studied a number of methods for minimizing effect of the interference signal by giving maximum gain to a direction toward the source signal and giving minimum gain to directions toward the interference signals by applying a corresponding weight or a phase delay corresponding to the phase of each weight to each of the antenna elements.

Herein, the design of the array antenna means that determination of the weight to be multiplied with a signal applied to each of the antenna elements included in the array antenna or the phase delay to be added to the phase of the signal arrived at each of the antenna elements.

As a method for obtaining the weight or the phase delay as described above, there have been already proposed a variety of methods of which algorithms are mostly based on Eigenvalue Decomposition. However, the methods based on the Eigenvalue Decomposition are not favorable to the mobile telecommunications that requires real time processing because they should processes a plenty of computations, although they provide accurate solutions. Furthermore, though it seems that another method employing a Least Mean Square Error algorithm has some possibility for overcoming the real time processing since computation load can be reduced to a certain extent as related to the Eigenvalue Decomposition methods, this method has another problem in that a receiver part should know a reference signal.

On the other hand, in a conventional nonlinear on-off algorithm, output power of the array antenna is compared with output power of each element of the array and when the phase of the element after a phase gain s added to the phase of the elements. And then, if comparison result is positive, the phase of the corresponding element is increased by some amount; and, if the comparison result is negative, the phase of the corresponding element is decreased by some amount. Such a nonlinear on-off algorithm is disclosed in detail in "A Nonlinear Algorithm for Output Power Maximization of an Indoor Adaptive Phased Array," IEEE Electromagnetic Compatibility, vol. 37, no. 2, pp. 201–209, May, 1995, T. Denidni and G. Y. Delisle.

However, in the conventional nonlinear on-off algorithm, it is difficult to determine the phase gain and change of the output power from the phase gain leads to error when signal environment changes. Furthermore, because the conventional nonlinear on-off algorithm determines independently the phase delay for each element of the array antenna by inspecting change of the power for each antenna phase, it requires output power computations of the order of $2N^2$ in case of the one-dimensional linear array antenna and beam forming computation of the order of $2N^2+2N$ per snap shot.

Therefore, the conventional nonlinear on-off algorithm is not applicable to the communications because it requires large amount of computations and has difficulty of determining not only adaptive gain $\mu$ but also the phase gain $\Delta\phi$ during phase delay vector computation. Furthermore, because the phase delay or the weight should be changed continuously when communication environment is time-variant, the real time processing substantially is impossible.

In particular, in recent environment in which exponentially increase of the number of wireless communications subscribers, it is more eagerly demand for a signal processing technique capable of performing the real time processing and facilitating forming the ideal beam pattern to effectively accommodate the increasing subscribers.

SUMMARY OF THE INVENTION

Therefore, it is an object of the present invention to provide a signal processing method for use in a CDMA adaptive array antenna system, the method for forming the beam pattern by maximizing a tranceiving gain in a direction toward a target mobile station and optimizing the beam pattern in a moving direction depended on a moving direction of each target mobile station during signal transceiving between a base station and the mobile station, the method forming an ideal beam pattern by a simplified computation procedure, and a computer readable recording medium for storing a program for implementing the method.

And also, another object of the present invention is to provide a signal processing method for use in a CDMA adaptive array antenna system, the method comprising determining signature of gradient of output power of the array antenna to the phase of each antenna, updating the phase of each antenna by increasing or decreasing the phase by an adaptive gain depending on the signature of the corresponding gradient, determining weight corresponding to the updated phase, and applying the weight to a signal arrived at each antenna, and a computer readable recording medium for storing a program for implementing the method.

In particular, the object of the present invention is to provide a signal processing method for use in a CDMA adaptive array antenna system, the method applicable to not only a one-dimensional array antenna of N-by-1, N being the number of the antennas, but also a two-dimensional array antenna of N-by-N, N being the number of the antennas, and a computer readable recording medium for storing a program for implementing the method.

In accordance with an aspect of the present invention, there is provided a signal processing method for use in an adaptive array antenna system of a CDMA mobile communications network, the method comprising the steps of: (a) initializing a weight vector and a snapshot index; (b) obtaining gradient of output power of an array antenna to a phase of each of antennas in the array antenna system at every snapshot and determining whether an adaptive gain is added or subtracted depending on the signature of the gradient to update the phase of each antennas; and (c) determining a weight value for each of the antennas depending on the result of the step (b) at every snapshot to apply the weight value to a signal received at the corresponding one of the antennas.

In accordance with another aspect of the present invention, there is provided a signal processing method for use in an adaptive array antenna system of a CDMA mobile communications network, the method comprising the steps of: (a) initializing a weight vector and a snapshot index; (b) when a signal is received, computing an output signal based on an equation as: $y = \underline{w}^H \cdot \underline{x}$; (c) computing the gradient of the output power to the phase of each of the antennas based on an equation as:

$$\Delta_m P = \frac{\partial P}{\partial w_m^*} \frac{\partial w_m^*}{\partial \phi_m} = -jx_m w_m^* y^*;$$

(d) determining whether an adaptive gain is added to a phase delay vector value or subtracted from the phase delay vector depending on the signature of the gradient to update the phase delay vector based on an equation as: $\underline{\Phi}_{n+1} = \underline{\Phi}_n + \mu \cdot \text{sign}(\nabla P)$; (e) updating the weight vector by using the updated phase delay vector based on an equation as: $\underline{w}_{n+1} = e^{j\underline{\Phi}_{n+1}}$; (f) repeating the steps of (d) to (g) after a next signal received to perform signal processing over the signal at every snapshot.

In accordance with still another aspect of the present invention, there is provided a computer readable recording medium for storing a program for implementing, in a CDMA adaptive array antenna system having a processor, to maximizing transceiving gain only in a direction toward a target mobile station during transceivng a signal between a base station and the mobile station, the functions of: (a) initializing a weight vector and a snapshot index; (b) obtaining gradient of output power of an array antenna to a phase of each of antennas in the array antenna system at every snapshot and determining whether an adaptive gain is added or subtracted depending on the signature of the gradient to update the phase of each antennas; and (c) determining a weight value for each of the antennas depending on the result of the step (b) at every snapshot to apply the weight value to a signal received at the corresponding one of the antennas.

In accordance with another aspect of the present invention, there is provided a computer readable recording medium for storing a program for implementing, in a CDMA adaptive array antenna system having a processor, to maximizing transceiving gain only in a direction to a target mobile station during transceivng a signal between a base station and a mobile station, the functions of: (a) initializing a weight vector and a snapshot index; (b) when a signal is received, computing an output signal based on an equation as: $y = \underline{w}^H \cdot \underline{x}$; (c) computing the gradient of the output power to the phase of each of the antennas based on an equation as:

$$\Delta_m P = \frac{\partial P}{\partial w_m^*} \frac{\partial w_m^*}{\partial \phi_m} = -jx_m w_m^* y^*;$$

(d) determining whether an adaptive gain is added to a phase delay vector value or subtracted from the phase delay vector value depending on the signature of the gradient to update the chase delay vector based on an equation as: $\underline{\Phi}_{n+1} = \underline{\Phi}_n + \mu \cdot \text{sign}(\nabla P)$; (e) updating the weight vector by using the updated phase delay vector based on an equation as: $\underline{w}_{n-1} = e^{j\underline{\Phi}_{n+1}}$; (f) repeating the steps of (d) to (g) after a next signal received to perform signal processing over the signal at every snapshot.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

<Design of One-Dimensional Optimum Array Antenna>

A first, it will be described in detail for design of a one-dimensional optimum array antenna.

Figure 1:
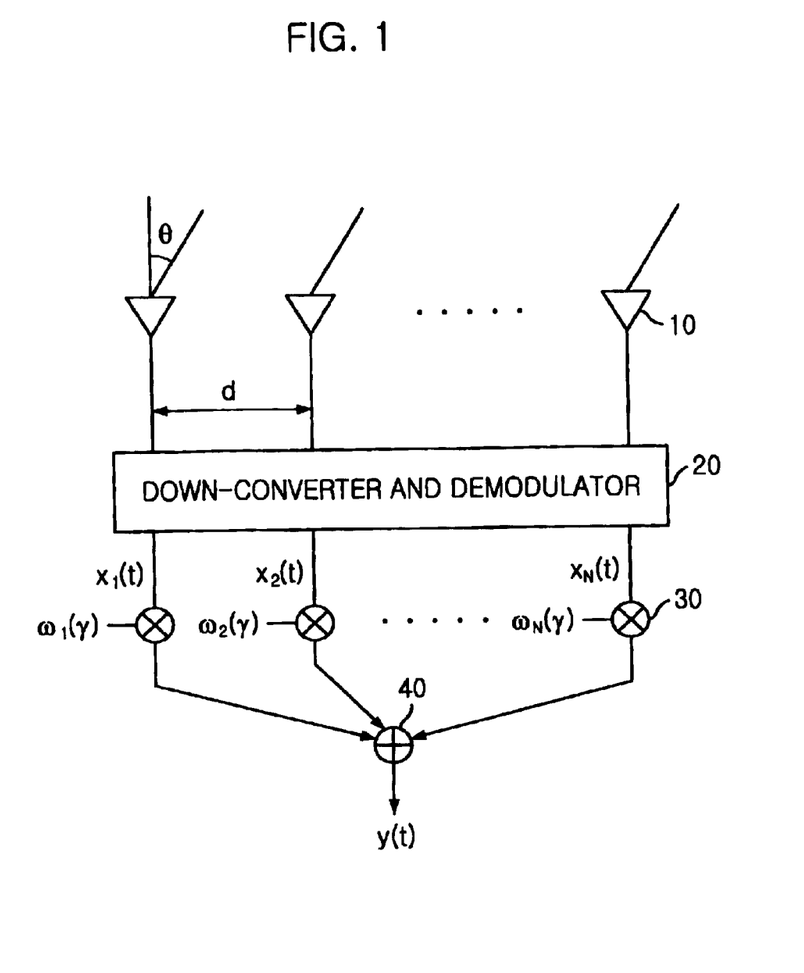
FIG. 1 is an exemplary diagram of a one-dimensional array antenna system in a CDMA telecommunications network, to which the present invention is applied.
Figure 2:
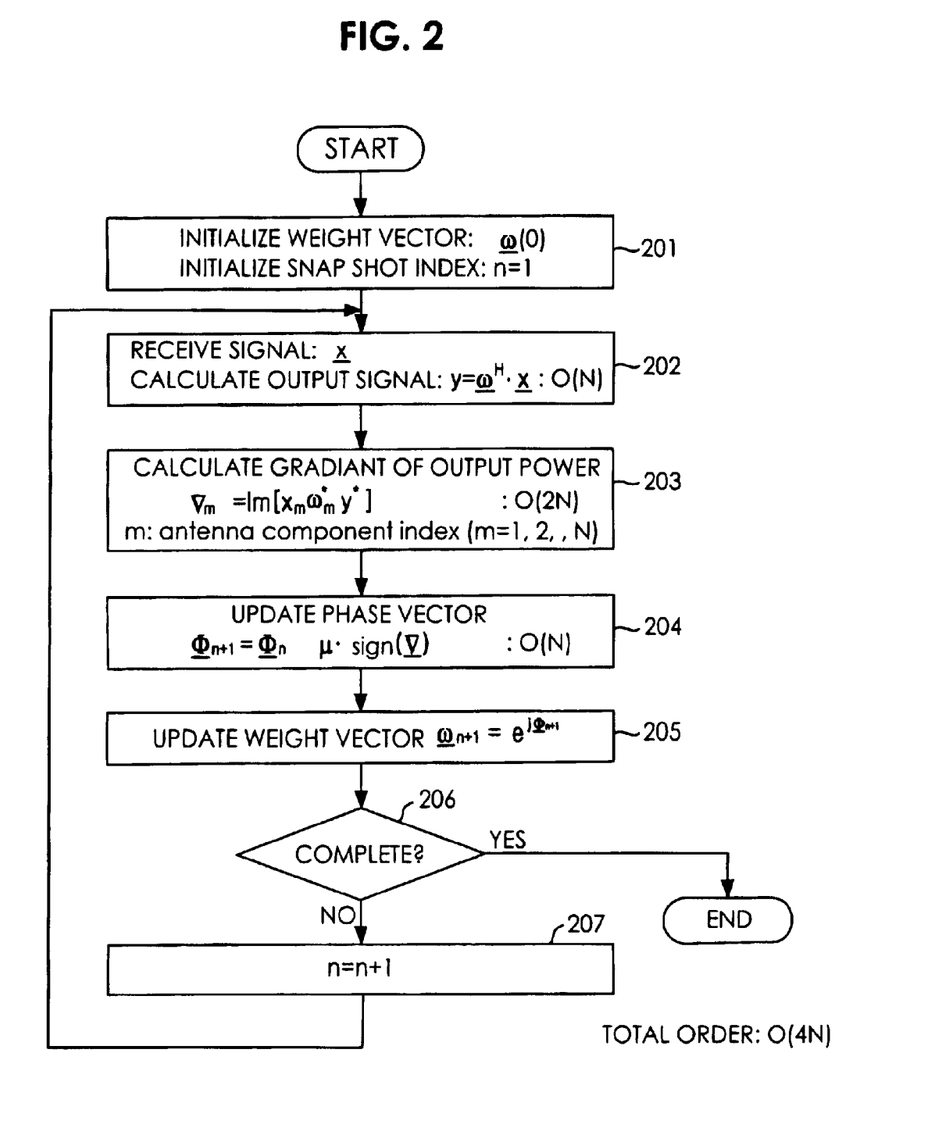
FIG. 2 shows a flow chart of a signal processing method for forming an ideal beam pattern in the one-dimensional array antenna system as shown in FIG. 1.

FIG. 1 is an exemplary diagram of a one-dimensional array antenna system in a CDMA telecommunications network, to which the present invention is applied and FIG. 2 shows a flow chart of a signal processing method for forming an ideal beam pattern in the one-dimensional array antenna system as shown in FIG. 1.

Referring to FIG. 1, M signals $S_1(t), S_2(t), \ldots, S_M(t)$ are applied to N receiving antennas. In FIG. 1, the array antenna includes array antenna elements 10, a down-converter and demodulator 20, a multiplier 30, and an adder 40. $x_m(t)$ is a signal arrived at an m-th antenna, $\omega_m$ is a complex weight vector applied to the arrived signal at the m-th antenna to form a desirable beam pattern, and y(t) is an output of the array antenna.

Herein, the output y(t) of the array antenna can be expressed as follows:

$$y = \underline{w}^* \cdot \underline{x} = \sum_{m=1}^{N} w_m^* x_m \quad \text{Eq. (1)}$$

where $w_m^*$ is conjugate of $w_m$.

Although Eq. (1) expressed for the case of a linear array antenna, it will be appreciated that the present invention can be applicable to optimum beam pattern forming without limited by the format of the array antenna.

As described above, it is most important to determine the complex gain to be multiplied to the signal arrived at each element of the array antenna or to determine the phase delay to be added to the signal arrived at each element of the array antenna. Determining the complex gain is mathematically equivalent to determining the phase delay.

That is, the object of the array antenna design is to determine the complex weight vector $\underline{w}$ to form the desirable beam pattern and subsequently to approach the output of the array antenna, i.e., an inner product of the complex weigh vector $\underline{w}$ and the signal arrived at the antenna element, to a desirable value. A procedure of normalizing size of each element of the complex weight vector $\underline{w}$ to 1 and multiplying the terminated signal at each antenna element with the weight vector $\underline{w}$ is equivalent to adding the phase delay, i.e., the phase of the gain vector $\underline{w}$, to the signal. Therefore, design of the array antenna is determining the phase delay to be added to each element of the array antenna.

In a linear array antenna having a space $\lambda_c/2$ between adjacent antenna elements, $\lambda_c$ being a wavelength of a carrier frequency of an input signal, the signal arrived at the m-th antenna element and transferred to a base-band frequency can be expressed as follows:

$$x_m(t) = \sum_{k=1}^{M} s_k(t) e^{j(m-1)\pi \sin\theta_k} + n_m(t) \quad \text{Eq. (2)}$$

where $s_k(t)$ is a signal value received at a reference antenna for a signal transmitted from a k-th signal source, $\theta_k$ is an angle of arrival of the k-th signal source, and $n_m(t)$ is noise added to the m-th antenna element, index m being a positive integer from 1 to N for representing order of size of the phase of the receiving or transmitted signal and N=1 for the reference antenna.

In Eq. (2), one among the M signals is a source signal and remaining M-1 signals are interference signals that disturbs communications along with the noise $n_m(t)$. And also, though Eq. (2) is expressed for the case of a linear array antenna having a uniform space $\lambda_c/2$, this should not be appreciated as limiting the present invention.

Assuming a distance between the reference antenna and the m-th antenna as $d_m$, phase difference between the signal at the reference antenna and the signal at the m-th antenna is expressed as follows:

$$2\pi \frac{d_m}{\lambda_c} \sin\theta_k \quad \text{Eq. (3)}$$

Accordingly, in a non-uniform space or nonlinear array, the signal arrived at the m-th antenna is expressed as follows:

$$x_m(t) = \sum_{k=1}^{M} s_k(t) e^{j 2\pi \frac{d_m}{\lambda_c} \sin\theta_k} + n_m(t) \quad \text{Eq. (4)}$$

In present invention, in order to make the phase delay or time delay to be applied to each antenna element positive, the antenna element having a latest chase is selected as the reference antenna during receiving mode and the antenna element having a most leading phase is selected as the reference antenna during transmitting mode.

Defining the reference antenna as described above, the signal arrived at the reference antenna has no phase difference (phase 0) and the remaining antennas can be designed by applying positive phase differences in the array antenna design.

If the array antenna is constructed by N antennas, N-by-1 signal vector, i.e., a vector including N elements, is received at every snap shot and vector representation of the received signal can be expressed as follows:

$$\underline{x}(t) = A\underline{s}(t) + \underline{n}(t) \quad \text{Eq. (5)}$$

In Eq. (5), since the received signal $\underline{x}(t)$ is N-by-1, the noise $\underline{n}(t)$ is also N-by-1 vector and $s(t)$ is M-by-1 when the M signals are received. Accordingly, elements of the $\underline{x}(t)$, $\underline{n}(t)$ and $s(t)$ are constructed as will be expressed in following Eqs.(6) to (8) where superscript T represents transpose operation.

$$\underline{x}(t) = [x_1(t) x_2(t) \ldots x_N(t)]^T \quad \text{Eq. (6)}$$

$$\underline{n}(t) = [n_1(t) n_2(t) \ldots n_N(t)]^T \quad \text{Eq. (7)}$$

$$\underline{s}(t) = [s_1(t) s_2(t) \ldots s_M(t)]^T \quad \text{Eq. (8)}$$

And also, direction vector A is a N-Dy-M matrix that represents directions in which the M signals are received at the N antennas. Each column of the matrix A depicts signal direction of the antenna element, which can be expressed as follows:

$$\underline{a}(\theta_k) = [1 e^{j\pi \sin\theta_k} \ldots e^{j(n-1)\pi \sin\theta_k}] \quad \text{Eq. (9)}$$

where k corresponds to a k-th signal among the M signals.

A nonlinear on-off technique used in the present invention obtains gradient of the received signal to the output power and then obtains the updated phase delay vector by adding or subtracting the adaptive gain to or form the phase delay vector depending on the signature of the gradient, which can be shown in Eq. (10).

$$\Phi_{n+1} = \Phi_n + \mu \cdot \text{sign}(\nabla P) \quad \text{Eq. (10)}$$

where the phase delay vector $\Phi$ is $[\Phi_1 \Phi_2 \ldots \Phi N]$. For the sake of convenience, it is assumed that the array antenna is a linear array having N antennas spaced by a half wavelength from each other, $\mu$ is the adaptive gain by which the phase delay is increased or decreased depending on the gradient of the output power, $\nabla P$ is the gradient of the output power and a signum function sign outputs the signature of $\nabla P$.

It is known that optimum range of the adaptive gain $\mu$ for the typical land mobile communications is between 0 to 0.5 from a number of computer simulations.

The output power gradient $\nabla P$ is expressed as follows:

$$\nabla P = \begin{bmatrix} \frac{\partial P}{\partial \phi_1} \\ \frac{\partial P}{\partial \phi_2} \\ \vdots \\ \frac{\partial P}{\partial \phi_N} \end{bmatrix} \quad \text{Eq. (11)}$$

The $\nabla P$ is the gradient of the output power to the phase of each antenna and the gradient of the output power of the m-th antenna among the N antennas is $\nabla_m P$ that can be expressed as following Eq. (12) applying Chain rule to consider gradient to gain vector including the phase for the gradient of the output power to the phase.

$$\nabla_m P = \frac{\partial P}{\partial \phi_m} = \frac{\partial P}{\partial w_m^*} \frac{\partial w_m^*}{\partial \phi_m} \quad \text{Eq. (12)}$$

Therefore, the gradient of the output power of each antenna element can be expressed as follows:

$$\nabla P = \begin{bmatrix} \frac{\partial P}{\partial \phi_1} \\ \frac{\partial P}{\partial \phi_2} \\ \vdots \\ \frac{\partial P}{\partial \phi_N} \end{bmatrix} = \text{Re} \begin{bmatrix} \frac{\partial P}{\partial w_1^*} \frac{\partial w_1^*}{\partial \phi_1} \\ \frac{\partial P}{\partial w_2^*} \frac{\partial w_2^*}{\partial \phi_2} \\ \vdots \\ \frac{\partial P}{\partial w_N^*} \frac{\partial w_N^*}{\partial \phi_N} \end{bmatrix} \quad \text{Eq. (13)}$$

In Eq. (13), the gradient corresponding to the m-th antenna element $\nabla_m P$ can be obtained as will be described below.

The output signal for which the weight vector and the received signal are computed is expressed as follows:

$$y = \underline{w}^* \cdot \underline{x} = \sum_{m=1}^{N} w_m^* x_m \quad \text{Eq. (14)}$$

And the power of the output signal is as follows:

$$P = y \cdot y^* \quad \text{Eq. (15)}$$

Therefore, Eq. (12) can be expressed as follows:

$$\frac{\partial P}{\partial w_m^*} = \frac{\partial}{\partial w_m^*} \left( \sum_{m=1}^{N} w_m^* x_m \sum_{n=1}^{N} x_n^* w_n \right) \quad \text{Eq. (16)}$$

$$= x_m \sum_{n=1}^{N} x_n^* w_n = x_m y^*$$

$$\frac{\partial w_m^*}{\partial \phi_m} = -je^{-j\phi m} = -j w_m^* \quad \text{Eq. (17)}$$

From Eqs. (16) and (17), $\nabla_m P$ can be expressed as follows:

$$\nabla_m P = \frac{\partial P}{\partial w_m^*} \frac{\partial w_m^*}{\partial \phi_m} = -j x_m w_m^* y^* \quad \text{Eq. (18)}$$

Because Eq. (18) is a constant value, it can be expressed as simple as follows:

$$\nabla_m P = \text{Im}[x_m w_m^* y^*] \quad \text{Eq. (19)}$$

where Im is an operation for extracting imaginary part only.

Therefore, the gradients for all of the antenna elements can be expressed as follows:

$$\nabla P = \begin{bmatrix} \frac{\partial P}{\partial \phi_1} \\ \frac{\partial P}{\partial \phi_2} \\ \vdots \\ \frac{\partial P}{\partial \phi_N} \end{bmatrix} = \text{Re} \begin{bmatrix} \frac{\partial P}{\partial w_1^*} \frac{\partial w_1^*}{\partial \phi_1} \\ \frac{\partial P}{\partial w_2^*} \frac{\partial w_2^*}{\partial \phi_2} \\ \vdots \\ \frac{\partial P}{\partial w_N^*} \frac{\partial w_N^*}{\partial \phi_N} \end{bmatrix} = \text{Im} \begin{bmatrix} x_1 w_1^* y^* \\ x_2 w_2^* y^* \\ \vdots \\ x_N w_N^* y^* \end{bmatrix} \quad \text{Eq. (20)}$$

And Then, after substituting Eq. (20) for Eq. (10) and updating the phase, the weight can be determined as follows:

$$\underline{w}_{n+1} = e^{j\underline{\Phi}_{n-1}} \quad \text{Eq. (21)}$$

Hereinafter, the whole procedure for obtaining the optimum phase delay vector described above as an embodiment is discussed in reference to FIG. 2.

At first, at step 201, the weight vector $\underline{w}(0)$ is initialized to a predetermined value before a first signal is received and a snapshot index is initialized. Herein, the snapshot is time for computing a new weight vector (or a new phase delay vector) by measuring the signal received at the array antenna and, in the present invention, the array antenna is designed at every snapshot by computing a proper weight vector (or phase delay vector) corresponding to a newly received signal at every snapshot.

And then, at step 202, when the first signal ($\underline{x}(t)$) is received, the output signal ($y = \underline{w}^H \cdot x$) corresponding to the first signal. And then, at step 203, the gradient of the output power of each antenna element is computed as in Eq. (18) and, at step 204, the adaptive gain is added to the current phase or subtracted from the current phase depending on the signature of the computed gradient to update the phase. And also, at step 205, by using the updated phase vector, the weight vector is updated as in Eq. (21).

And then, at step 207, if it is necessary to update the weight (determined in step 206), a next signal ($\underline{x}(t)$) is received and the procedure goes back to the step 202 where the output signal ($y = \underline{w}^H \cdot x$) is computed to repeat the above procedure at every snapshot (otherwise, the process ends).

Because the signal processing method of the present invention requires neither priori information for the direction of the source signal nor priori information for the interference signals, it is can be applied to an adaptive array antenna system for a blind signal And, in the signal processing method of the present invention, computations for obtaining the optimum phase delay vector include computations of the order of N for the output signal, computations of the order of 2N for the gradient of the output power and computations of the order of N for the phase delay vector when the number of the antenna elements is N, i.e., totally computations of the order or 4N for each snapshot.

Therefore, since the number of computations in the present invention are reduced significantly comparing with the number of computations of the order of $2N^2+2N$ in the conventional on-off algorithm, an ordinary processor can be used to process signal recovery and transmission in the real communications environment. Of course, in the land mobile communications in which velocity of the mobile station is less than 150 Km/h, a commonly used signal processor can be used.

In a computer simulation, using the array antenna system of the present invention, a beam pattern of a maximum gain is formed in the direction of the source signal. And also, the subscriber capability to the number of antenna is analyzed. For example, when processing gain is 100, i.e., transmission bandwidth is 100 times larger than signal bandwidth, and bit error rate of $10^{-2}$ is required, the computer simulation shows that the array antenna system of the present invention can accommodate at least 60 subscribers when using 12 antenna elements are used while the conventional array antenna could accommodate about 4 mobile stations. And also, when bit error rate of 0.2 is required as in IS-95 specification CDMA communications system, the computer simulation shows the array antenna system of the present invention can accommodate subscriber 6 times more than the conventional antenna system when the 12 antenna elements are used.

<Two-Dimension Optimum Array Antenna Design>

Figure 3:
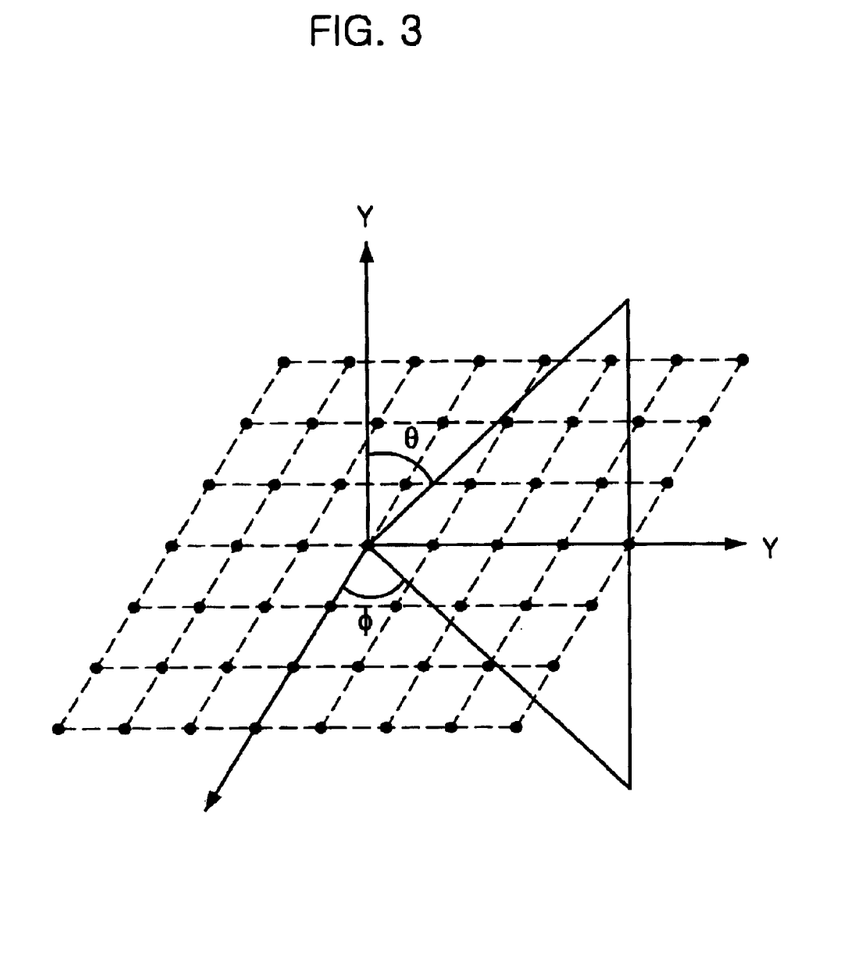
FIG. 3 offers an exemplary diagram of a two-dimensional array antenna system in a CDMA telecommunications network, to witch the present invention is applied.
Figure 4:
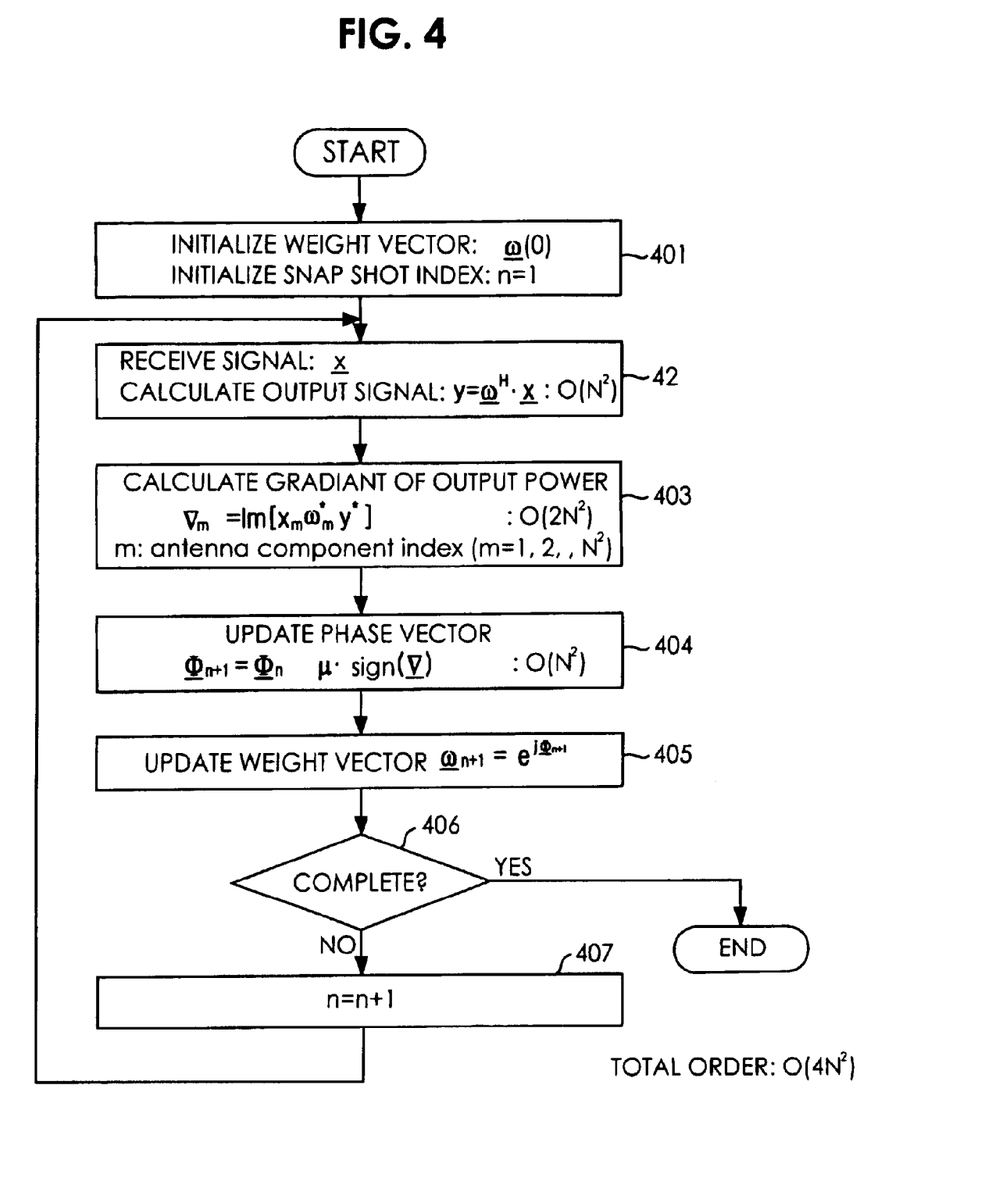
FIG. 4 provides a flow chart of a signal processing method for forming an ideal beam pattern in the two-dimensional array antenna system as shown in FIG. 3.

FIG. 3 offers an exemplary diagram of a two-dimensional array antenna system in a CDMA telecommunications network, to which the present invention is applied and FIG. 4 provides a flow chart of a signal processing method for forming an ideal beam pattern in the two-dimensional array antenna system as shown in FIG. 3.

Hereinafter, it will be described in detail for the signal processing method for use in the array antenna constructed by N×N antenna elements.

As shown in FIG. 3, assuming that the array includes antenna elements spaced from each other by a half wavelength in vertical and horizontal directions and the signal arrived to the antenna is a narrow band plain wave, each of the antenna elements has an incident angle identical to each other. And the signal inputted to the two-dimensional array has the time delay and phase difference corresponding to the time delay between the antennas as follows:

$$\gamma_x = \frac{d\sin\theta\cos\phi}{c}, \gamma_y = \frac{d\sin\theta\sin\phi}{c} \quad \text{Eq. (22)}$$

where x represents horizontal direction and y represents vertical direction.

$$\phi_x = \pi \sin\theta \cos\phi, \phi_y = \pi \sin\theta \cos\phi \quad \text{Eq. (23)}$$

where x represents horizontal direction and y represents vertical direction.

Considering N×N linear array antenna in which the antenna elements are spaced by the half wavelength as described above, the signal inputted to one of the antenna elements that is disposed at a horizontally m-th and vertically m-th position can be expressed as follows:

$$x_{m,n}(t) = \sum_{k=1}^{L} s_k(t) e^{j[(m-1)\pi\sin\theta_k\cos\phi_k + (n-1)\pi\sin\theta_k\sin\phi_k]} + n_{m,n}(t) \quad \text{Eq. (24)}$$

where $s_k(t)$ is a received value corresponding to a signal transmitted from the k-th signal source, $\theta_k$ is an angle of arrival of the k-th signal source and $\phi_k$ is an azimuth of an angle of arrival of the k-th signal source, and $n_{m,n}(t)$ is noise that is white gaussian additive noise having zero means value added to the antenna element disposed at the horizontally m-th and vertically m-th position.

Accordingly, a signal vector (x(t)) of N×N received signals can be as follows:

$$\underline{x}(t) = A\underline{s}(t) + \underline{n}(t) \quad \text{Eq. (25)}$$

In Eq. (5), since the received signal $\underline{x}(t)$ is constructed as follows:

$$\underline{x}(t) = \begin{bmatrix} x_{1,1(t)} & x_{1,2(t)} & \cdots & x_{1,N(t)} \\ x_{2,1(t)} & x_{2,2(t)} & \cdots & x_{2,N(t)} \\ & & \cdots & \\ x_{N,1(t)} & x_{N,2(t)} & \cdots & x_{N,N(t)} \end{bmatrix}^T \quad \text{Eq. (26)}$$

And, the noise vector added to each antenna receiver is constructed as follows:

$$\underline{n}(t) = \begin{bmatrix} n_{1,1(t)} & n_{1,2(t)} & \cdots & n_{1,N(t)} \\ n_{2,1(t)} & n_{2,2(t)} & \cdots & n_{2,N(t)} \\ & & \cdots & \\ n_{N,1(t)} & n_{N,2(t)} & \cdots & n_{N,N(t)} \end{bmatrix}^T \quad \text{Eq. (27)}$$

Accordingly, the received signal $\underline{x}(t)$ and the noise vector n(t) are respectively $N^2 \times 1$, $\underline{s}(t:)$ is a vector having M×1 signal components. And also, direction vector A is a $N^2 \times M$ matrix of which each column $\underline{a}(\theta_k, \phi_k)$ and each component can be expressed as follows:

$$\underline{a}(\theta_k, \phi_k) = \begin{bmatrix} 1 & \alpha & \alpha^2 & \cdots & \alpha^{N-1} \\ \beta & \alpha\beta & \alpha\beta^2 & \cdots & \alpha^{N-1}\beta \\ & & & \cdots & \\ \beta^{N-1} & \alpha\beta^{N-1} & & \cdots & \alpha^{N-1}\beta^{N-1} \end{bmatrix} \quad \text{Eq. (28)}$$

where $\alpha = e^{j\pi \sin\theta_k \cos\phi_k}$ and $\beta = e^{j\pi \sin\theta^k \sin\phi^k}$.

And also, the phase $\Phi$ of each antenna element to be adjusted in order to obtain the optimum weight can be expressed as follows:

$$\Phi = [\phi_1 \ \phi_1 \ \cdots \ \phi_{N^2}] \quad \text{Eq. (29)}$$

A method for obtaining the phase vector $\Phi$ of each antenna element and the gradient $\nabla P$ according to the present invention is similar to the method for the one-dimensional array antenna as described above, except that the number of the antenna elements is $N^2$ not N.

Therefore, the gradient of power of each antenna element is expressed as follows:

$$\nabla P = \begin{bmatrix} \frac{\partial P}{\partial \phi_1} \\ \frac{\partial P}{\partial \phi_2} \\ \cdots \\ \frac{\partial P}{\partial \phi_{N^2}} \end{bmatrix} = Re \begin{bmatrix} \frac{\partial P}{\partial w_1^*} \frac{\partial w_1^*}{\partial \phi_1} \\ \frac{\partial P}{\partial w_2^*} \frac{\partial w_2^*}{\partial \phi_2} \\ \cdots \\ \frac{\partial P}{\partial w_{N^2}^*} \frac{\partial w_{N^2}^*}{\partial \phi_{N^2}} \end{bmatrix} \quad \text{Eq. (30)}$$

In Eq. (30), the weigh vector is constructed as follows:

$$\underline{w}(t) = \begin{bmatrix} w_{1,1(t)} & w_{1,2(t)} & \cdots & w_{1,N(t)} \\ w_{2,1(t)} & w_{2,2(t)} & \cdots & w_{2,N(t)} \\ & & \cdots & \\ w_{N,1(t)} & w_{N,2(t)} & \cdots & w_{N,N(t)} \end{bmatrix}^T \quad \text{Eq. (31)}$$

Now, the gradient ($\nabla_m P$) corresponding to the m-th antenna element power is obtained as described below.

Because the output signal for which the weight vector and the received signal are computed is as following Eq. (32) and the power of the output signal is as following Eq. (33), the gradient $\nabla_m P$ can be expressed as following Eq. (36) from Eqs. (34) and (35).

$$y = \underline{w}^* \cdot \underline{x} = \sum_{m=1}^{N^2} w_m^* x_m \quad \text{Eq. (32)}$$

$$P = y \cdot y^* \quad \text{Eq. (33)}$$

$$\frac{\partial P}{\partial w_m^*} = \frac{\partial}{\partial w_m^*} \left( \sum_{m=1}^{N^2} w_m^* x_m \sum_{m=1}^{N^2} w_n^* w_n \right)$$

$$= x_m \sum_{m=1}^{N^2} x_n^* w_n = x_m y^* \quad \text{Eq. (34)}$$

$$\frac{\partial w_m^*}{\partial \phi_m} = -j e^{-j\phi_m} = -j w_m^* \quad \text{Eq. (35)}$$

$$\nabla_m P = \frac{\partial P}{\partial w_m^*} \frac{\partial w_m^*}{\partial \phi_m} = -j x_m w_m^* y^* \quad \text{Eq. (36)}$$

Because Eq. (35) is a constant value, Eq. (36) can be expressed as simple as follows:

$$\nabla_m P = Im[x_m w_m y] \quad \text{Eq. (37)}$$

Therefore, the gradients for all of the antenna elements can be expressed as follows:

$$\nabla P = \begin{bmatrix} \frac{\partial P}{\partial \phi_1} \\ \frac{\partial P}{\partial \phi_2} \\ \vdots \\ \frac{\partial P}{\partial \phi_{N^2}} \end{bmatrix} = \mathrm{Re} \begin{bmatrix} \frac{\partial P}{\partial w_1^*} \frac{\partial w_1^*}{\partial \phi_1} \\ \frac{\partial P}{\partial w_2^*} \frac{\partial w_2^*}{\partial \phi_2} \\ \vdots \\ \frac{\partial P}{\partial w_{N^2}^*} \frac{\partial w_{N^2}^*}{\partial \phi_{N^2}} \end{bmatrix} = \mathrm{Im} \begin{bmatrix} x_1 w_1^* y^* \\ x_2 w_2^* y^* \\ \vdots \\ x_{N^2} w_{N^2}^* y^* \end{bmatrix} \quad \text{Eq. (38)}$$

Therefore, by using Eq. (37), the phase and the weight can be updated as following Eqs. (39) and (40).

$$\Phi_{n+1} = \Phi_m + \mu \cdot \mathrm{sign}(\nabla P) \quad \text{Eq. (39)}$$

$$\underline{w}_{n+1} = e^{j\Phi}{}_{n-1} \quad \text{Eq. (40)}$$

Herein, the whole procedure for obtaining the optimum phase delay vector described above as an embodiment is summarized referring to FIG. 4.

At first, at step 401, the weight vector $\underline{w}(0)$ is initialized to a predetermined value before a first signal is received and a snapshot index is initialized. And then, at step 402, when the first signal ($\underline{x}(t)$) is received, the output signal ($y = \underline{w}^H \cdot \underline{x}$) corresponding to the first signal.

And then, at step 403, the gradient of the output power of each antenna element is computed as in Eq. (31) and, at step 404, the adaptive gain is added to the current phase or subtracted from the current phase depending on the signature of the computed gradient to update the phase as in Eq. (40) And also, at step 405, by using the updated phase vector, the weight vector is updated.

And then, at step 407, if it is necessary to update the weight (determined at step 406), a next signal ($\underline{x}(t)$) is received and the procedure goes back to the step 402 where the output signal ($y = \underline{w}^H \cdot x$) is computed to repeat the above procedure at every snapshot (otherwise, the process ends).

Figure 5:
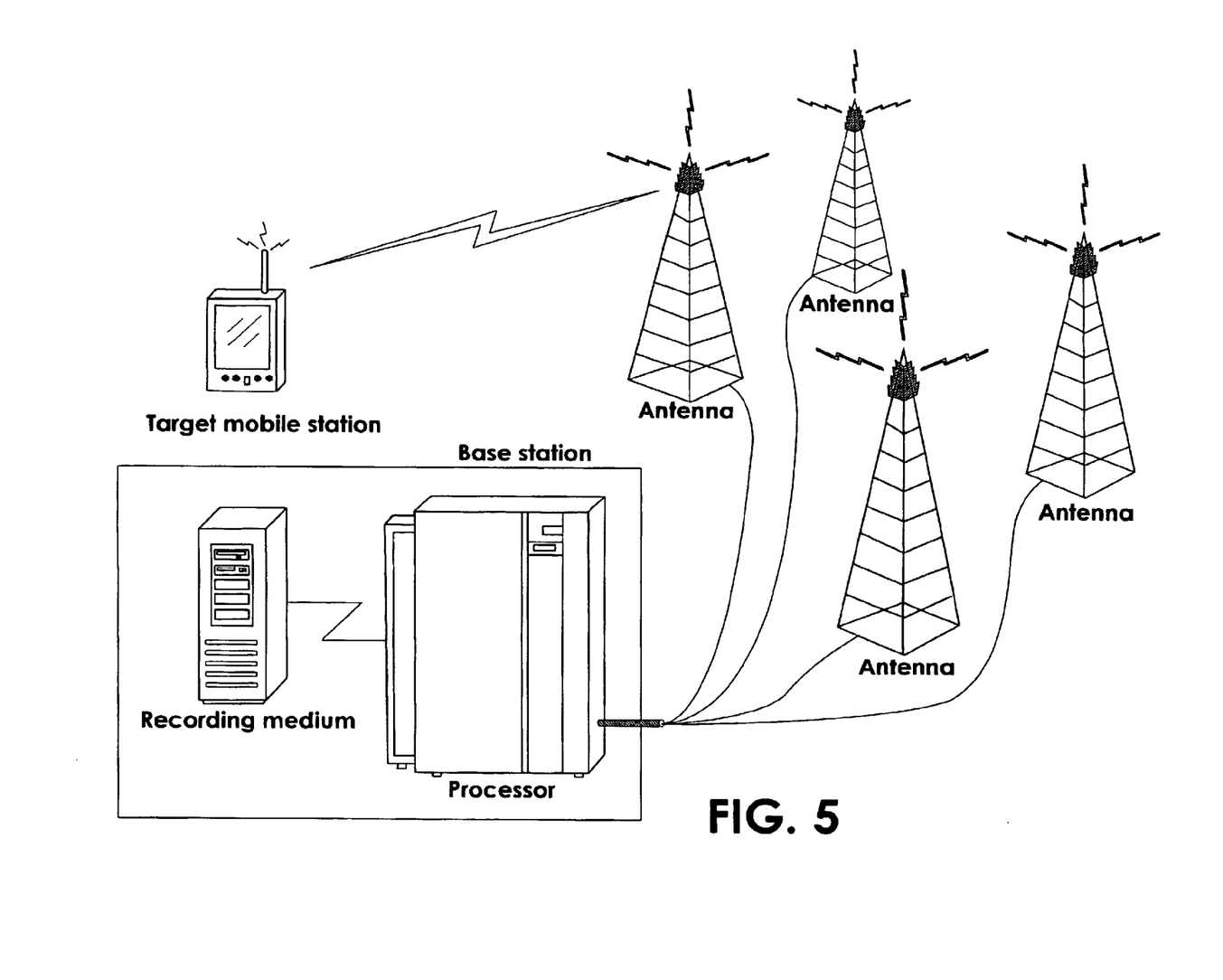
FIG. 5 is a block diagram illustrating a CDMA adaptive array antenna system.

Additionally, FIG. 5 shows a CDMA adaptive array antenna system for maximizing transceiver gain only in a direction toward a target mobile station, during transception between a base station and the mobile station. The system includes a processor and a storage medium on which programs may be stored.

Because the signal processing method of the present invention requires neither priori information for the direction of the source signal nor priori information for the interference signals, it is can be applied to an adaptive array antenna system for a blind signal.

And, an the signal processing method of the present invention, computations for obtaining the optimum phase delay vector include computations of the order of $N^2$ for the output signal, computations of the order of $2N^2$ for the gradient of the output power and computations the order of $N^2$ for the phase delay vector when the number of the antenna elements N, i.e., totally computations the order of $4N^2$ for each snapshot.

Therefore, an ordinary processor can be used to process signal recovery and transmission in the real communications environment for the two-dimensional array antenna.

According to the present invention as described above, the output power of the array antenna can be adjusted more accurately than the conventional on-off algorithm by determining the phase of each antenna independently by checking the gradient power variation to each antenna phase. And also, because the present invention reduces the computations in the beam forming procedure significantly, it can be applied to the mobile communications system that requires fast response.

And, because the present invention provides the optimum beam pattern minimizing the effect of the interference to each subscriber, it can increase the communication capability per cell within a given bandwidth and improves communication quality.

While the present invention has been shown and described with respect to the particular embodiments, it will be apparent to those skilled in the art that many changes and modifications may be made without departing from the spirit and scope of the invention as defined in the appended claims.

The present disclosure relates to subject matter contained in priority Republic of Korea Patent Application No. 1999-58065, filed on Dec. 15, 1999, the contents of which is herein expressly incorporated by reference in its entirety.

What is claimed is:

1. A signal processing method for use in an adaptive array antenna system of a CDMA (Code Division Multiple Access) mobile communications network, the method comprising the steps of:

initializing a weight vector and a snapshot index;

obtaining a gradient of output power of an array antenna to a phase of each antenna in the array antenna system at every snapshot and determining whether an adaptive gain is added or subtracted depending on the signature of the gradient to update the phase of each antenna; and determining a weight value for each of the antennas depending on the result of obtaining the gradient of output power and determining whether the adaptive gain is added or subtracted at every snapshot to apply the weight value to a signal received at the corresponding one of the antennas.

2. The method as recited in claim 1, wherein the obtaining the gradient of the output power and determining whether the adaptive gain is added or subtracted includes:

when a signal is received, computing an output signal $\underline{y}$ based on an equations:

$$y=\underline{w}^H \cdot \underline{x},$$

wherein y is the output signal of the array antenna, $\underline{w}^H$ is a complex weight vector and $\underline{x}$ is a signal received at an antenna;

computing the gradient of the output power to the phase of each of the antennas based on an equation:

$$\nabla_m P = \frac{\partial P}{\partial w_m^*} \frac{\partial w_m^*}{\partial \phi_m} = -j x_m w_m^* y_2^*$$

wherein $\nabla_m P$ is the gradient of the output power of an m-th antenna, $\phi_m$ is phase delay to be applied to the m-th antenna, $x_m$ is a signal received at the m-th antenna, $w_m$ is a complex weight vector applied to the signal received at the m-th antenna, $w_m^*$ is an conjugate of $w_m$ and $y^*$ is a conjugate of y;

determining whether the adaptive gain is added to a phase delay vector value or subtracted from the phase delay vector value depending on the signature of the gradient to update the phase delay vector based on an equation:

$$\underline{\Phi}_{n+1} = \underline{\Phi}_n + \mu \cdot \text{sign}(\underline{\nabla} P),$$

wherein $\Phi$ is the phase delay vector, $\mu$ is the adaptive gain, $\underline{\nabla} P$ is the gradient of the output power and a signum function sign outputs the signature of $\underline{\nabla} P$.

3. The method as recited in claim 2, wherein determining the weight value includes updating the weight vector by using the updated phase delay vector based on an equation:

$$\underline{w}_{n+1} = e^{j \underline{\Phi}_{n+1}},$$

wherein $\Phi$ is the phase delay vector.

4. The method as recited in claim 3, further comprising:

repeating computing the output signal, computing the gradient of the output power, determining whether the adaptive gain is added or subtracted and updating the weight vector, after a next signal is received to perform signal processing of the signal at every snapshot.

5. The method as recited in claim 4, wherein the adaptive array antenna system is a one-dimensional array antenna system.

6. The method as recited in claim 5, wherein a total number of computations is of the order of 4N including computation of the order of N for computing the output signal, computation of the order of 2N for computing the gradient of the output power and computation of the order of N for computing the phase delay vector, when the number of antennas is N, and wherein N is a natural number.

7. The method as recited in claim 4, wherein the adaptive array antenna system is a two-dimensional array antenna system.

8. The method as recited in claim 7, wherein a total number of computations is of the order of $4N^2$ including computation of the order of $N^2$ for computing the output signal, computation of the order of $2N^2$ for computing the gradient of the output power and computation of the order of $N^2$ for computing the phase delay vector, when the number of antennas is N, and wherein N is a natural number.

9. A computer-readable recording medium storing a program which implements a method for maximizing transceiving gain only in a direction toward a target mobile station during transceiving a signal between a base station and the mobile station, in a CDMA adaptive array antenna system having a processor, the method comprising:

initializing a weight vector and a snapshot index;

obtaining a gradient of output power of an array antenna to a phase of each of a plurality of antennas in the array antenna system at every snapshot and determining whether an adaptive gain is added or subtracted depending on a signature of the gradient to update the phase of each antenna; and determining a weight value for each of the antennas depending on a result of obtaining the gradient of the output power and determining whether the adaptive gain is added or subtracted, at every snapshot to apply the weight value to a signal received at a corresponding one of the antennas.

10. A computer readable recording medium storing a program which implements a method for maximizing transceiving gain only in a direction to a target mobile station during transceivng a signal between a base station and the mobile station, in a CDMA adaptive array antenna system having a processor, the method comprising:

initializing a weight vector and a snapshot index;

when a signal is received, computing an output signal based on an equation:

$$y=\underline{w}^H \cdot \underline{x},$$

wherein y is the output signal of an array antenna, $\underline{w}^H$ is a complex weight vector and $\underline{x}$ is a signal received at an antenna;

computing a gradient of an output power to a phase of each antenna in the array antenna system based on an equation:

$$\nabla_m P = \frac{\partial P}{\partial w_m^*} \frac{\partial w_m^*}{\partial \phi_m} = -j x_m w_m^* y_2^*$$

wherein $\nabla_m P$ is the gradient of the output power of an m-th antenna, $\phi_m$ is phase delay to be applied to the m-th antenna, $x_m$ is a signal received at the m-th antenna, $w_m$ is a complex weight vector applied to the arrived signal at the m-th antenna, $w_m^*$ is a conjugate of $w_m$, and $y^*$ is a conjugate of y;

determining whether an adaptive gain is added to a phase delay vector value or subtracted from the phase delay vector value depending on a signature of the gradient to update a phase delay vector based on an equation:

$$\underline{\Phi}_{n+1} \underline{\Phi}_n + \mu \cdot \text{sign}(\underline{\nabla} P),$$

wherein $\underline{\Phi}$ is the phase delay vector, $\mu$ is the adaptive gain, $\nabla P$ is the gradient of the output power and a signum function sign outputs the signature of $\nabla P$.

updating the weight vector by using the updated phase delay vector based on an equation:

$$\underline{w}_{n+1} = e^{j\underline{\Phi}_{n+1}},$$

wherein $\underline{\Phi}$ is the phase delay vector; and repeating computing the output signal, computing the gradient of the output power, determining whether the adaptive gain is added or subtracted, and updating the weight vector, after a next signal received to perform signal processing of the signal at every snapshot.

\* \* \* \* \*

UNITED STATES PATENT AND TRADEMARK OFFICE
CERTIFICATE OF CORRECTION

| | |
|---|---|
| PATENT NO. | : 6,950,457 B2 |
| APPLICATION NO. | : 09/734670 |
| DATED | : September 27, 2005 |
| INVENTOR(S) | : S. W. Choi |

It is certified that error appears in the above-identified patent and that said Letters Patent is hereby corrected as shown below:

On the title page Item (57), Abstract, line 3, after "Division" insert "Multiple".

At column 13, line 11 (claim 2, line 5) of the printed patent, "equations" should be ---equation---.

At column 13, line 20 (claim 2, line 12) of the printed patent, "2" should be --- , ---.

At column 13, line 28 (claim 2, line 17) of the printed patent, "an conjugate" should be ---a conjugate---.

At column 14, line 50 (claim 10, line 17) of the printed patent, "2" should be --- , ---.

At column 14, line 58 (claim 10, line 22) of the printed patent, "Wm*" should be ---W*m ---.

At column 15, line 3 (claim 10, line 30) of the printed patent, "sign" should be ---*sign*---.

At column 15, line 3 (claim 10, line 31) of the printed patent, " ." should be --- ; ---.

At column 14, line 31 (claim 10, line 4) of the printed patent, "transceivng" should be ---transceiving---

Signed and Sealed this

Twenty-second Day of August, 2006

JON W. DUDAS
*Director of the United States Patent and Trademark Office*